United States Patent [19]

Itoh et al.

[11] Patent Number: 4,909,614
[45] Date of Patent: Mar. 20, 1990

[54] VARIABLE MAGNIFICATION FINDER

[75] Inventors: Yoshinori Itoh; Hiroki Nakayama, both of Kanagawa, Japan

[73] Assignee: Canon Kabushiki Kaisha, Tokyo, Japan

[21] Appl. No.: 265,777

[22] Filed: Nov. 1, 1988

[30] Foreign Application Priority Data

Nov. 13, 1987 [JP] Japan .................. 62-287043
Nov. 13, 1987 [JP] Japan .................. 62-287044
May 18, 1988 [JP] Japan .................. 63-122458

[51] Int. Cl.⁴ .................. G02B 15/14; G02B 13/18; G03B 13/08; G03B 13/10
[52] U.S. Cl. .................. 350/423; 350/427; 350/432; 354/222; 354/225
[58] Field of Search .............. 350/423, 426, 427, 428, 350/432–435; 354/219, 222, 224, 225

[56] References Cited

U.S. PATENT DOCUMENTS

| | | | |
|---|---|---|---|
| 4,249,793 | 2/1981 | Uehara .................. | 350/423 X |
| 4,715,692 | 12/1987 | Yamada et al. .................. | 354/219 X |
| 4,725,130 | 2/1988 | Ozawa .................. | 350/427 |
| 4,757,336 | 7/1988 | Nakayama et al. .................. | 350/423 X |
| 4,779,969 | 10/1988 | Sato et al. .................. | 350/426 X |
| 4,812,023 | 3/1989 | Kikuchi .................. | 350/427 |
| 4,834,513 | 5/1989 | Nozawa .................. | 350/427 |
| 4,842,395 | 6/1989 | Sato et al. .................. | 350/423 X |

*Primary Examiner*—Scott J. Sugarman
*Attorney, Agent, or Firm*—Fitzpatrick, Cella, Harper & Scinto

[57] ABSTRACT

A finder optical system provided separately from a photographic lens having a variable magnification portion comprises, from front to rear, an objective lens unit having a first variable magnification portion, a Porro prism and an eyepiece lens unit having a second variable magnification portion. And, a first magnification change of the first variable magnification portion is achieved in association with the variable magnification portion of the photographic lens, and a second magnification change of the second variable magnification portion is achieved in association with trimming shot information.

18 Claims, 14 Drawing Sheets

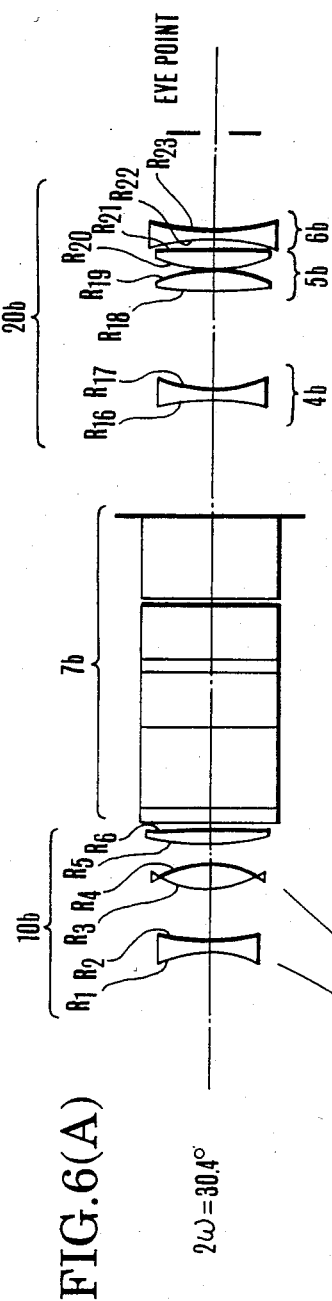
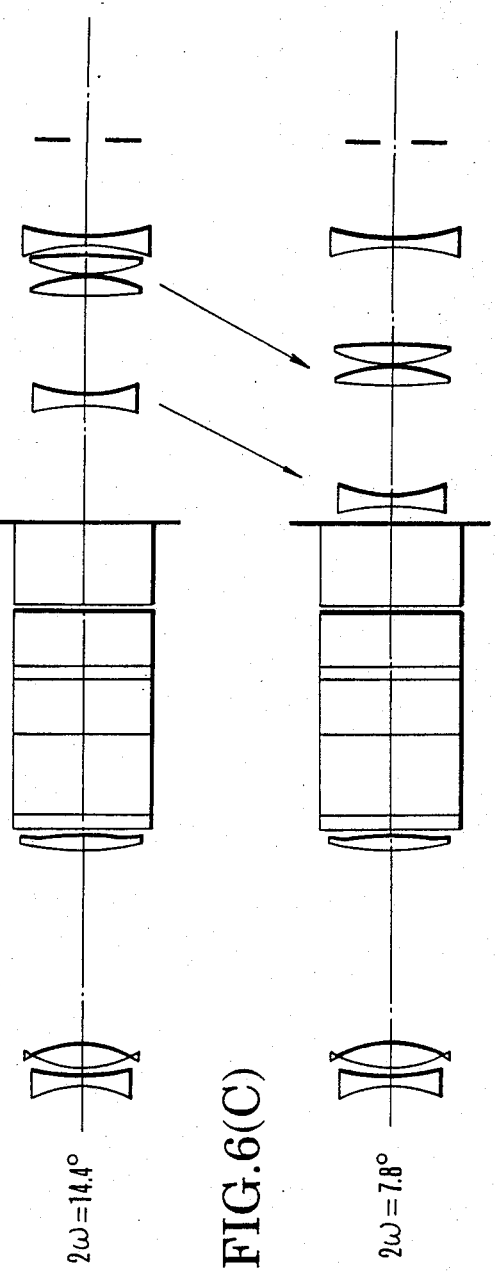
FIG.6(A)  $2\omega=30.4°$
FIG.6(B)  $2\omega=14.4°$
FIG.6(C)  $2\omega=7.8°$

VARIABLE MAGNIFICATION FINDER

BACKGROUND OF THE INVENTION

1. Field of the Invention:

This invention relates to variable magnification finders and, more particularly, to finders for lens shutter type cameras, video cameras, or the like in which the magnification of the field of view of the finder is varied over an extended range at high values of magnification, while still maintaining good optical performance throughout the extended range.

2. Description of the Related Art:

In the past, as the finder of which the magnification of the field of view is made variable to produce a variable magnification finder, variable magnification finders in which the variation of the magnification is performed by making such part of the objective lens, or a lens unit, movable in relation to a variation of the magnification of the photographic system have been proposed in, for example, Japanese Laid-Open Patent Application No. Sho 61-160713.

Also, observation systems such as telescopes and binoculars in which part of the eyepiece lens, or a lens unit, is made movable have been proposed in, for example, Japanese Patent Publication No. Sho 36-2723.

In the past, in the camera whose photographic system and finder system are separately constructed, when the photographic system is a variable magnification system, the use of the variable magnification finder is arranged so that the magnification of the field of view of the finder varies with a variation of the image magnification has been desired for shooting.

In this case, because of incorporation into the camera, what is desired is small size and, moreover of such a form as to easily obtain a predetermined ratio of magnification variation.

In recent years, in the field of art of compact cameras, such powerful zoom lenses which exceed 3× in the magnification variation ratio are anticipated. Also, various proposals for cameras having a capability for recording trimming information on film have been made. In accompaniment with this, the demand for a variable magnification finder having a high magnification variation ratio is much greater.

However, the conventional variable magnification finder in which the magnification is varied by the objective lens has a relatively small magnification variation ratio. To realize such a high magnification variation ratio as to exceed, for example, 3x, the lens diameter and the number of lens elements rapidly increases. Thus, the finder system tends to increase in bulk and size. Also, the lens structure tends to become complicated. Moreover, it has been very difficult to stabilize the variation in the aberrations with the variation of the magnification.

Also, in a camera having the capability of recording the trimming information on the film, the prior art shows that although the trimming information is provided by moving the objective lens to vary the finder magnification in response to a variation of the image magnification of the photographic lens, the field of view of the finder does not vary. This constituted another drawback that the effect of the trimming function is not communicated to the observer.

SUMMARY OF THE INVENTION

A first object of the present invention is to provide a finder optical device whose objective lens and eyepiece lens each are constructed so as to have a variable magnification portion, thereby enabling a desired high magnification variation ratio to be obtained with ease.

A second object is to provide a variable magnification finder of relatively compact form while still permitting the variation of aberration caused by the variation of the magnification to be minimized for high optical performance.

A third object is to provide a finder optical device suited to a camera capable of taking trimming shots.

BRIEF DESCRIPTION OF THE DRAWINGS

FIGS. 2(A)–2(C), FIGS. 3(A)–3(C), FIGS. 4(A)–4(C), FIGS. 5(A)–5(C) and FIGS. 6(A)–6(C) are longitudinal sectional views of numerical examples 1, 2, 3, 4 and 5 according to the invention, respectively.

In the lens block diagrams and aberration curves, FIGS. 2(A), 3(A), 4(A), 5(A), 6(A), 7(A), 8(A) and 9(A) are in the wide angle end; FIGS. 2(B), 3(B), 4(B), 5(B), 6(B), 7(B), 8(B) and 9(B) are in a state where a first magnification change has ended; FIGS. 2(C), 3(C), 4(C), 5(C), 6(C), 7(C), 8(C) and 9(C) are in a state where the first magnification change and a second magnification change have ended with the result of a highest magnification.

In the aberration graphs, d represents the d-line, g the g-line, M the meridional image surface and S the sagittal image surface.

DETAILED DESCRIPTION OF THE PREFERRED EMBODIMENTS

Figure 1:
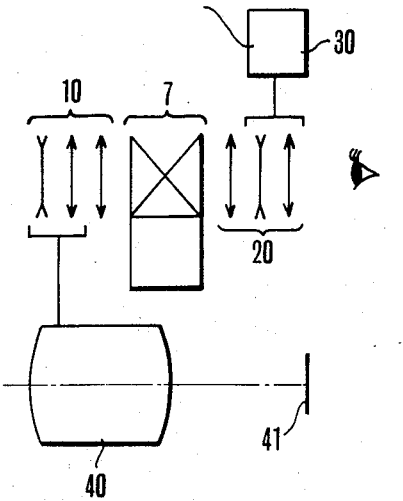
FIG. 1 is a schematic diagram illustrating the entirety of a photographic system according to the invention.

FIG. 1 is a diagram illustrating the outline of the whole photographic system according to the present invention. 40 is a photographic lens unit including a zoom portion; 41 is a film plane; 10, 7 and 20 are, respectively, an objective lens unit, a Porro prism and an eyepiece lens unit for determining a finder optical axis which is different from an optical axis of the photographic lens unit 40. 30 is an indicating means for indicating a trimming shot. The objective lens unit 10 includes a first variable magnification portion. And, this first variable magnification portion has an arrangement associated with a movable lens which moves for zooming in the photographic lens unit 40, so that in response to zooming of the photographic lens unit 40, the finder system also performs zooming at the same time. Meanwhile, the eyepiece lens unit 20 includes a second variable magnification portion, and this second variable magnification portion has a movable lens which moves along the finder optical axis in association with trimming shot information produced by the indicating means 30, thus performing a second magnification change.

It should be noted that the term "trimming shot" means that of the effective format of the image formed by the photographic lens, its partial region is set when shooting. And, that part of the image which lies in the region is enlarged when printing in a developing laboratory or the like. Hence, it corresponds to substantial extension of the image magnification although the size of the image on the film surface does not change. To display this, therefore, for the part of the eyepiece lens unit 20, the finder magnification is increased to falsely carry out the magnification change.

Next, a concrete construction and arrangement of the finder otical system is described by reference to FIG. 2(A) and those that follow.

In FIGS. 2(A)–2(C) and 3(A)–3(C), 1 is a first sub-lens unit of negative refractive power; 2 is a second sub-lens unit of positive refractive power; 3 is a third sub-lens unit of positive refractive power. These three sub-lens units 1, 2 and 3 constitute an objective lens unit 10 of positive refractive power as a whole. And, the first sub-lens unit 1 and the second sub-lens unit 2 are made to move in differential relation to each other along the finder optical axis to achieve a first magnification change, or constitute a first variable magnification portion. 7 is a Porro prism having four reflection surfaces from vertically and horizontally a reverse image from the finder image formed by the objective lens unit 10, though shown by developed glass blocks for the purpose of simplicity. 4 is a fixed first sub-lens unit of positive refractive power; 5 is a second sub-lens unit of positive refractive power; 6 is a third sub-lens unit of negative refractive power. These three sub-lens units 4, 5 and 6 constitute an eyepiece lens unit 20 of positive refractive power as a whole.

The second sub-lens unit 5 and the third sub-lens unit 6 of the eyepiece lens unit 20 are made to move in differential relation to each other along the finder optical axis to perform a second magnification change, or constitute a second variable magnification portion. 8 is a pupil position for observation.

In this embodiment, the third sub-lens unit 3 of the objective lens unit 10 and the first sub-lens unit 4 of the eyepiece lens unit 20 may be molded either independently of or in a united form with parts of the Porro prism 7.

In this embodiment, the finder image to be formed by the objective lens unit 10 comprised of the above-described first sub-lens unit 1, second sub-lens unit 2 and third sub-lens unit 3 is made to focus at a plane in the interior of the Porro prism 7 arranged in a space between the third sub-lens unit 3 and the first sub-lens unit 4, or in the neighborhood of the Porro prism 7. Such a finder image after having been inverted by the Porro prism 7 to an erecting non-reverse image, is observed through the eyepiece lens unit 20 comprised of the first sub-lens unit 4, the second sub-lens unit 5 and the third sub-lens unit 6 at the pupil position 8 where the erecting non-reverse finder image is a good match for the finder eyesight.

Figure 2A:
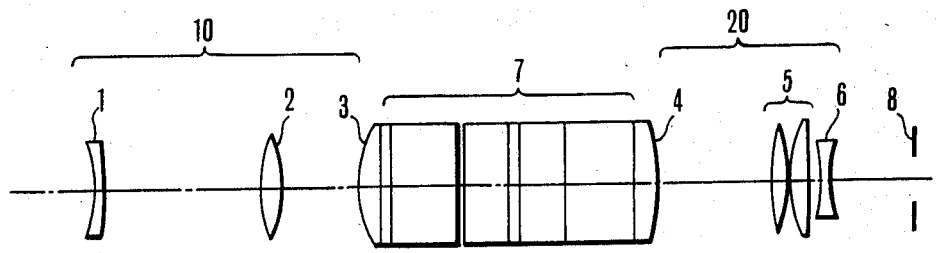
Figure 2B:
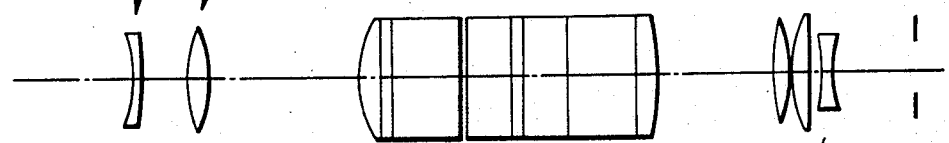
Figure 2C:
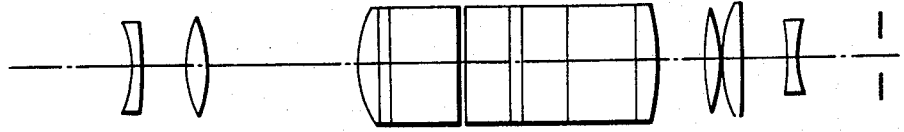
Figure 3A:
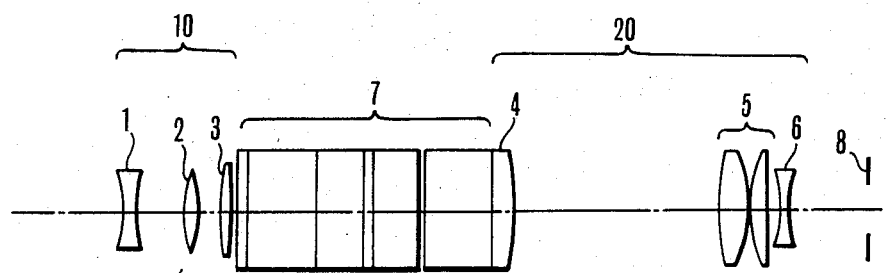
Figure 3B:
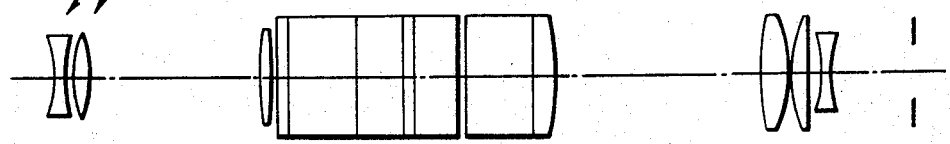
Figure 3C:
Figure 4A:
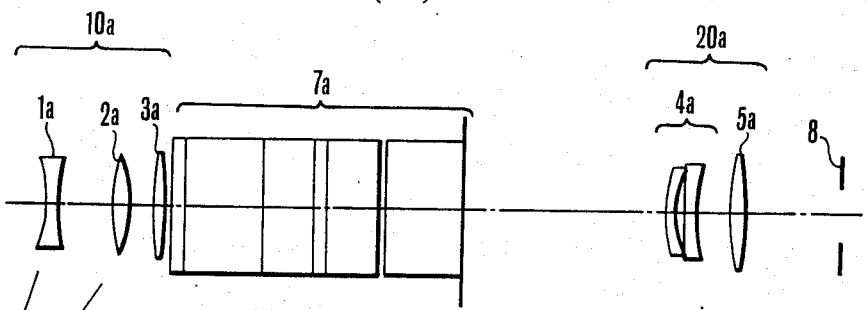
Figure 4B:
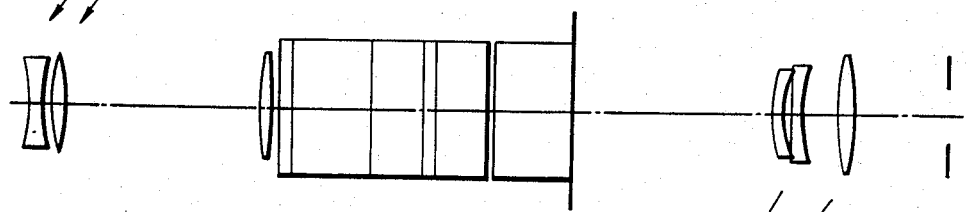
Figure 4C:
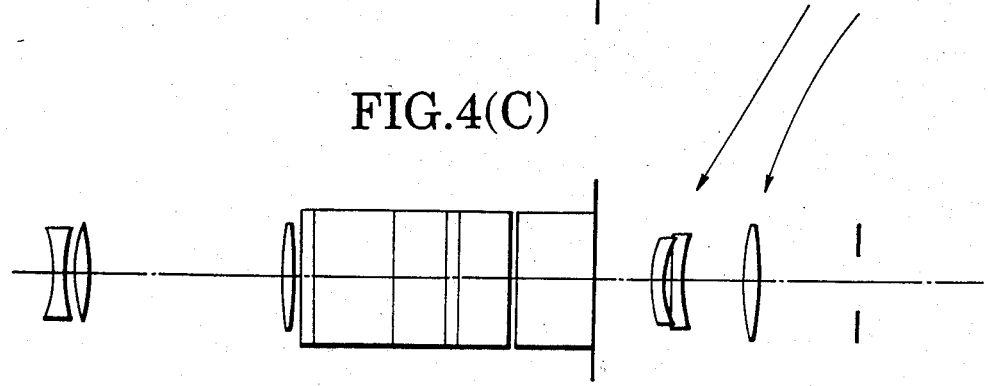
Figure 5A:
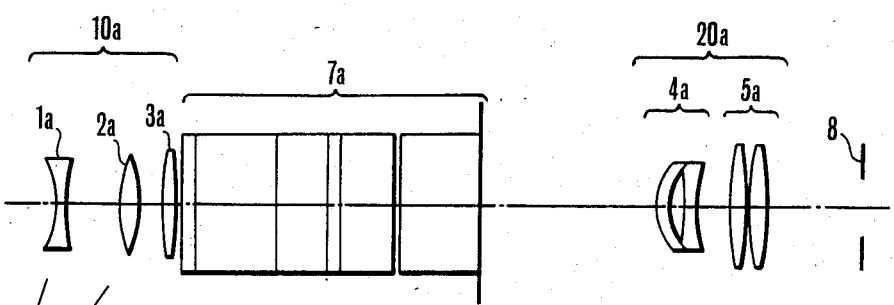
Figure 5B:
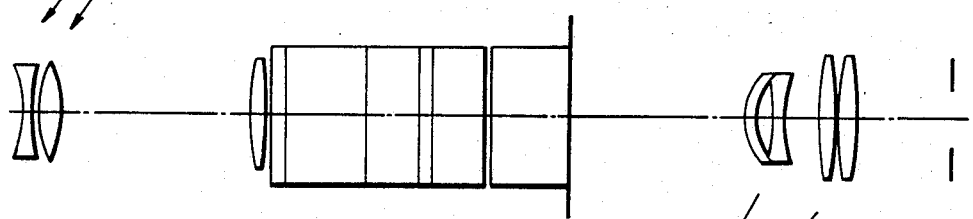
Figure 5C:
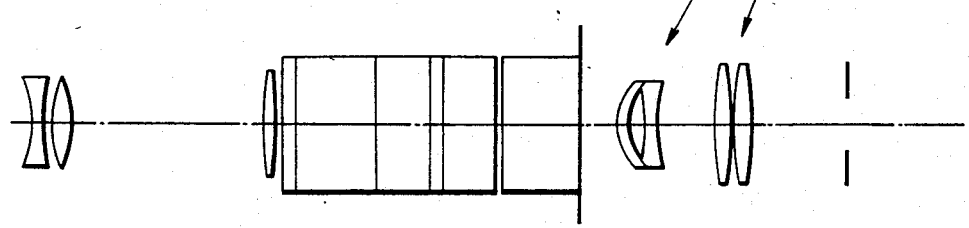
Figure 7A:
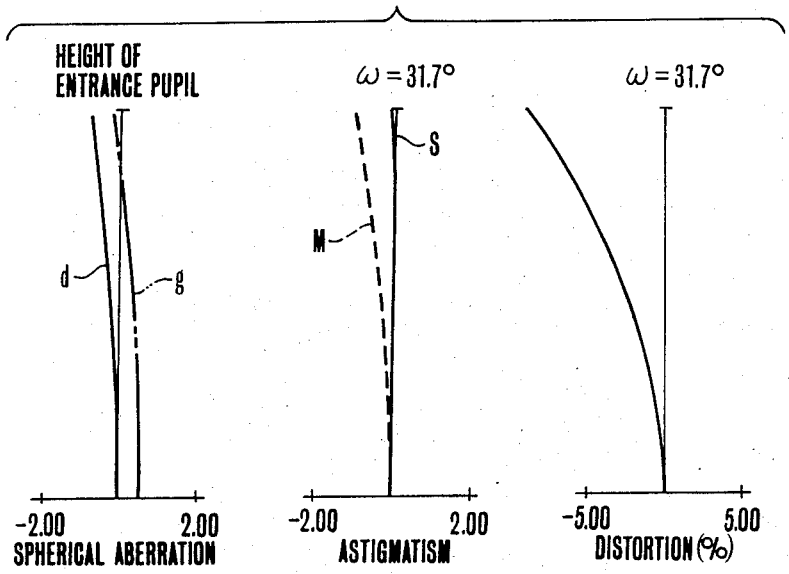
FIGS. 7(A)–7(C), FIGS. 8(A)–8(C), FIGS. 9(A)–9(C), FIGS. 10(A)–10(C) and FIGS. 11(A)–11(C) are graphic representations of the various aberrations of the numerical examples 1, 2, 3, 4 and 5 according to the invention.
Figure 7B:
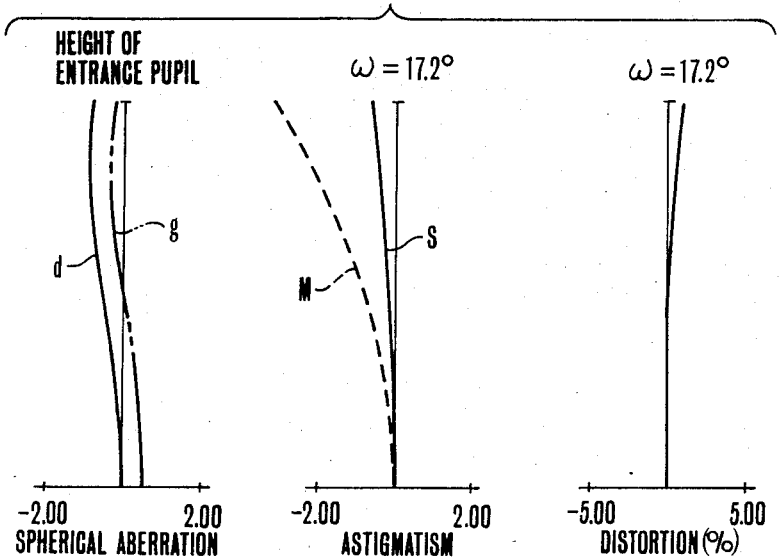
Figure 7C:
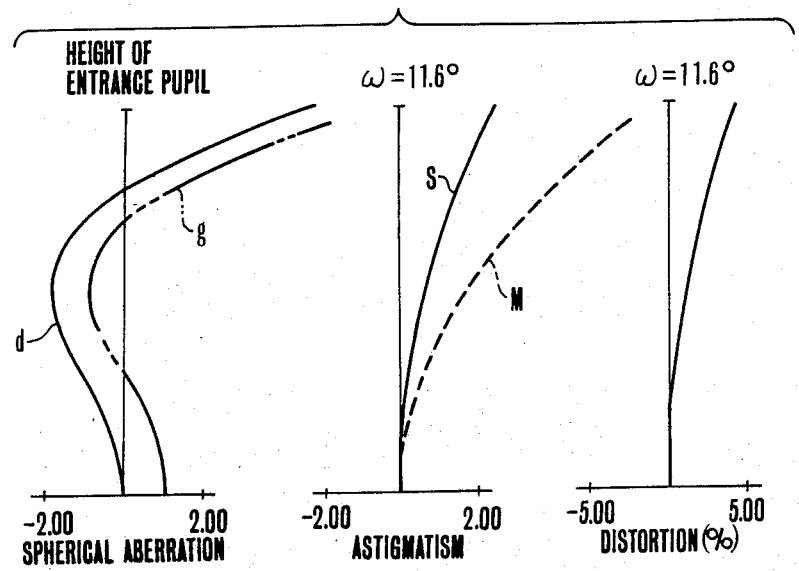
Figure 8A:
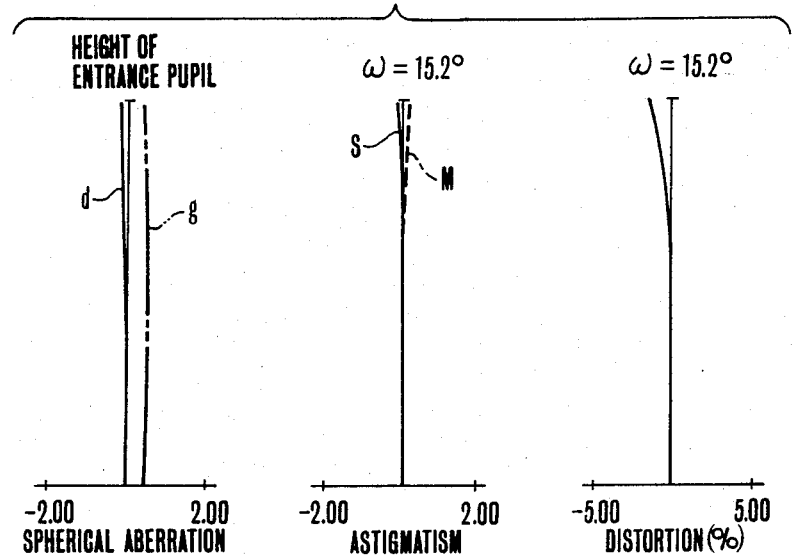
Figure 8B:
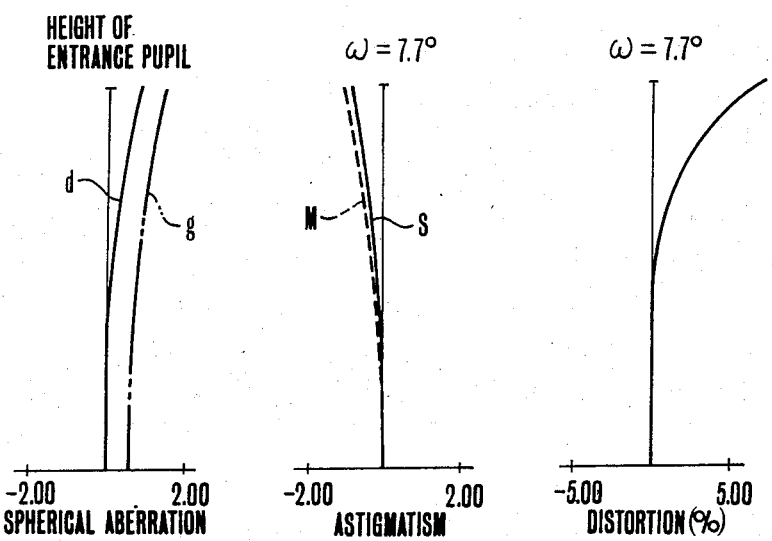
Figure 8C:
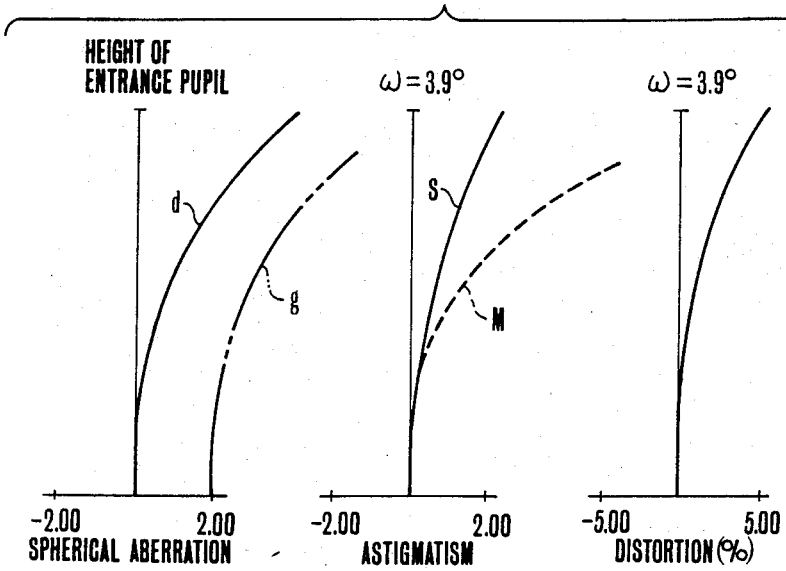
Figure 9A:
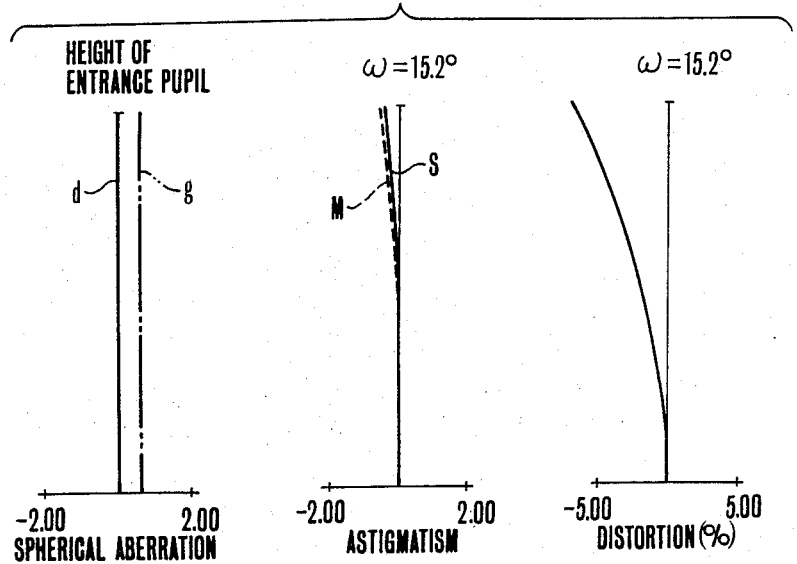
Figure 9B:
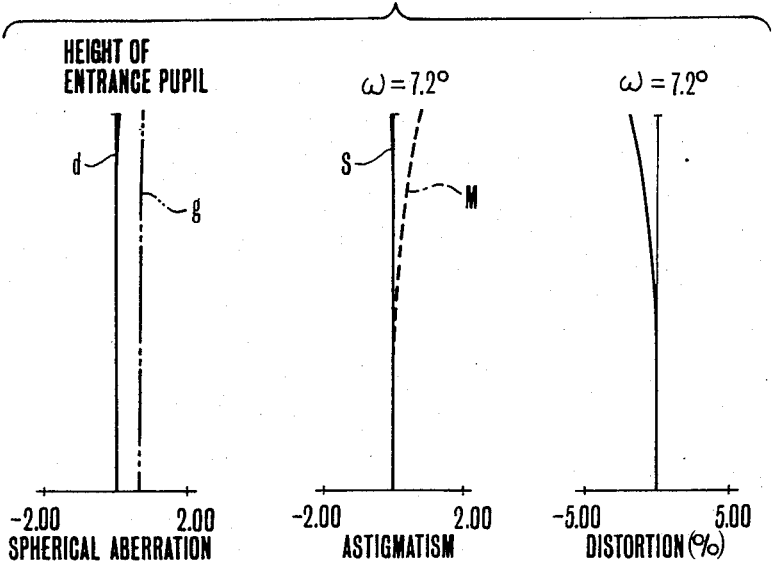
Figure 9C:
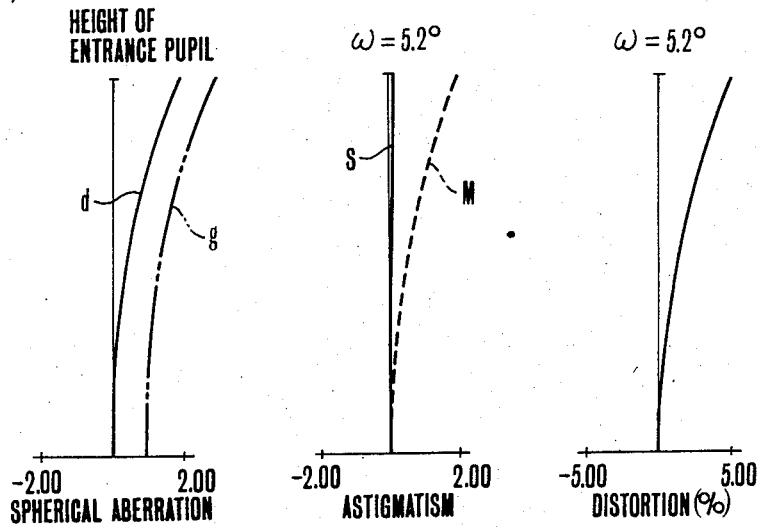
Figure 10A:
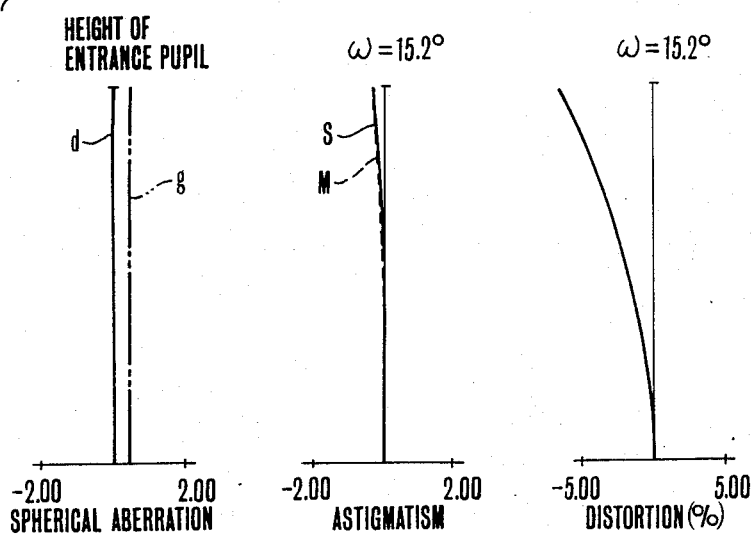
Figure 10B:
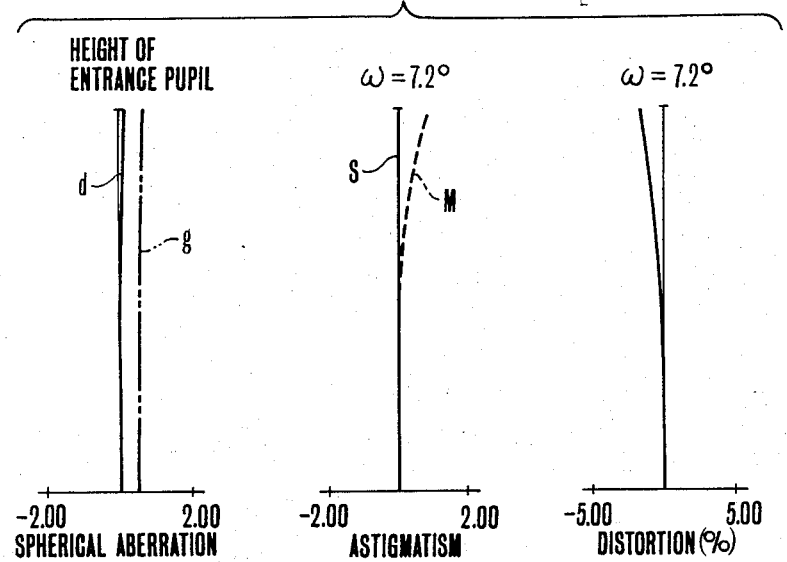
Figure 10C:
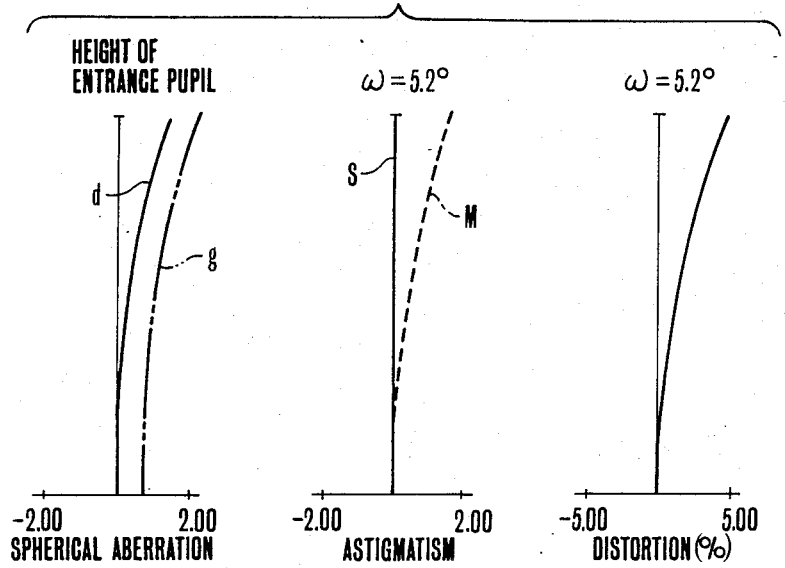
Figure 11A:
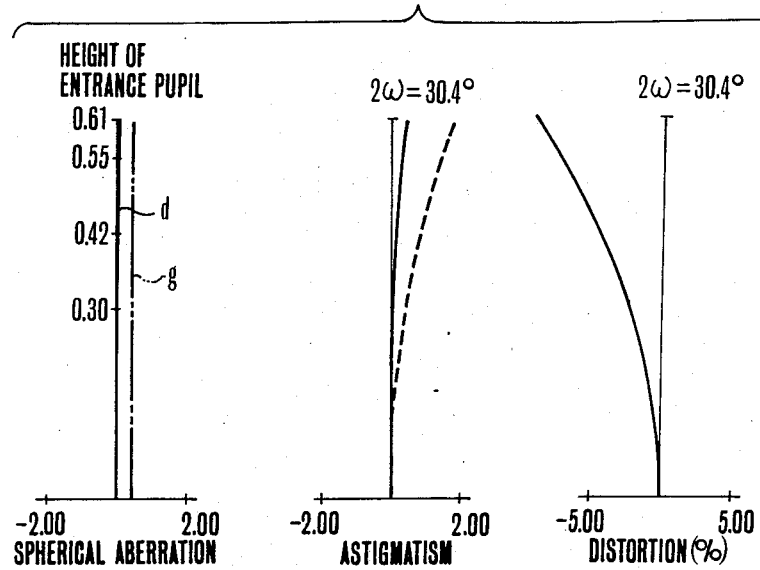
Figure 11B:
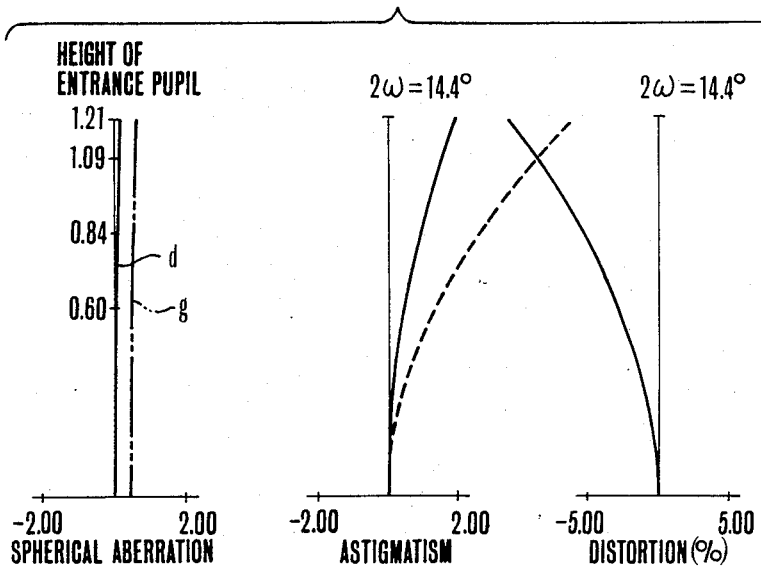
Figure 11C:
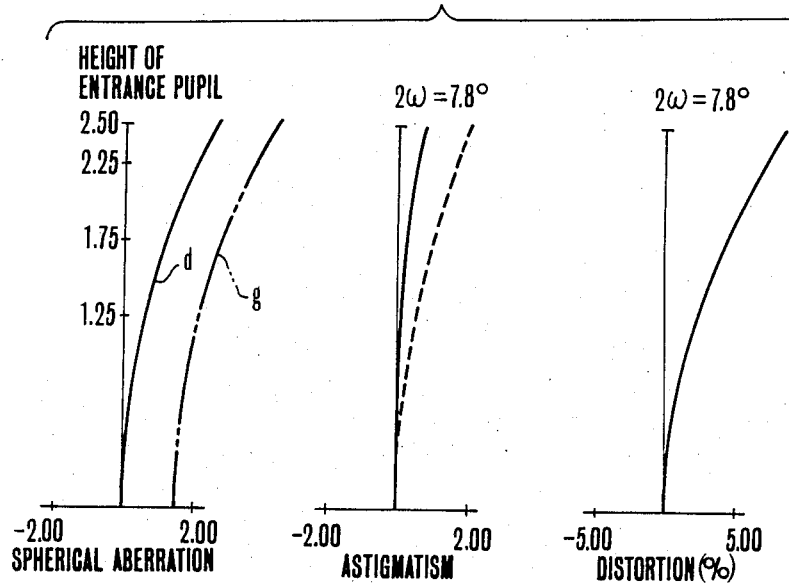

FIGS. 2(A) and 3(A) are schematic diagrams illustrating the paraxial optical arrangements of the variable magnification finders in the wide angle end. FIGS. 2(B) and 3(B) are schematic diagrams illustrating the paraxial optical arrangements of the variable magnification finders in an operative position where a first magnification change has been effected by the first variable magnification portion which is part of the objective lens unit 10 as moved from the operative position of FIGS. 2(A) and 3(A). FIGS. 2(C) and 3(C) are schematic diagrams of the paraxial optical arrangements of the variable magnification finders in another operative position or the telephoto end, where a second magnification change has been performed by the second variable magnification portion which is part of the eyepiece lens unit 20 when moved from the position of FIGS. 2(B) and 3(B).

In this embodiment, the first magnification change is carried out in such a manner that, as shown in FIGS. 2(A) and 2(B), or 3(A) and 3(B), the second sub-lens unit 2 is moved toward the object as indicated by an arrow to effect changing of the magnification, while the resultant image shift is compensated for by non-linearly moving the first sub-lens unit 1 as depicting a locus convex toward the image plane as indicated by an arrow.

In addition, when the second sub-unit 2 has moved a somewhat long distance to the object side that the first magnification change is stopped. The second magnification change is then carried out in such a manner that, as shown in FIGS. 2(B) and 2(C) or 3(B) and 3(C), the second sub-lens unit 5 of the eyepiece lens unit 20 is moved toward the object as indicated by an arrow to effect changing of the magnification for the purpose of enlarging the finder image, while the resultant change of the finder eyesight is compensated for by non-linearly moving the third sub-lens unit 6 as depicting a locus convex to the object side as indicated by an arrow.

It should be noted that in this embodiment, to maintain excellent observation of the finder image, it is preferable to satisfy the following condition.

Letting the state in which the above-described second sub-lens unit 2 and second sub-lens unit 5 lie most toward the eyepiece side (the state of the lowest finder magnification) be denoted by State 1, the state in which the second sub-lens unit 2 lies most toward the object side and the second sub-lens unit 5 lies most toward the eyepiece side (the state in which only the first magnification change has been effected) by state 2, the state in which the second sub-lens unit 2 and the second sub-lens unit 5 lie most toward the object side (when the finder magnification is greatest) by State 3, the focal length of the whole objective lens unit 10 and the focal length of the whole eyepiece lens unit 20, both of which lie in State 1, by fa1 (in air), and fb1 (in air) respectively, and the focal length of the whole objective lens unit 10 and the focal length of the whole eyepiece lens unit 20, both of which lie in state 3 by fa3 (in air) and fb3 (in air) respectively, it is desirable to satisfy the following condition:

$$0.4 < (fa3 \cdot fb3)/(fa1 \cdot fb1) < 2.5 \tag{1}$$

When the upper limit of the inequalities of condition (1) is exceeded, the magnification variation ratio of the objective lens unit 10 side gets too large with the result that the size of the entire lens system is greatly increased, and the range of variation of the aberrations also is increased with an increase in the difficulty of performing good aberration correction in the wide angle end.

Also, in this embodiment, to allow a constant eye point to be maintained without suffering from shading of the marginal zone of the field of view, it is preferable to satisfy the following condition.

That is, concerning the distance from a prescribed image plane in the neighborhood of the Porro prism (on which the objective lens forms an image) to the nearest lens surface in the third sub-lens unit 6 to the eye point, or the last vertex, letting the value of the distance in the wide angle end be denoted by $d_W$ and the value of the distance in the telephoto end by $d_T$, it is desirable to satisfy the following conditions:

$$-0.2 < (d_T - d_W)/(d_T + d_W) < 0.2 \quad (2)$$

When the upper limit or the lower limit of the inequalities of condition (2) is exceeded, it is difficult to realize a system in which with the constant eye point position, the marginal portions of the field of view are not shaded over the entire range of variation of the magnification.

When the lower limit is exceeded, conversely, the magnification variation ratio of the eyepiece lens unit 20 side gets too large with the result that the total length of the lens is elongated, and the variation of the aberrations also exceeds the acceptable range, making it difficult to properly correct the various aberrations in the telephoto end.

It should be noted that in this embodiment, a first sub-lens unit 1 of positive refractive power may be used in constructing the objective lens unit 10. Even in this case, similar advantages to those described above can be obtained.

Also, in this embodiment, the variable magnification portions of the objective lens unit and the eyepiece lens unit may otherwise be constructed from ones of the interchangeable type comprised of lens units releasably insertable to the optical axis for the purpose of changing the magnification. Even in this case, the features of the invention can apply.

In this embodiment, the first magnification may otherwise be effected by the variable magnification portion of the eyepiece lens unit, and the second magnification change by the variable magnification portion of the objective lens unit.

Also, when the second sub-lens unit 5 is constructed with two lenses, one of which is a positive lens of which both lens surfaces are convex, and the other of which is a positive lens whose front lens surface is convex, and the third sub-lens unit 6 is constructed with a negative lens of which both lens surfaces are concave, a finder optical system which is compact, while still preserving good aberration correction, can be achieved.

FIGS. 4(A)–4(C) and 5(A)–5(C) are diagrams illustrating another embodiment of the finder optical system of the invention, its operational principle being similar to that of the embodiment shown in FIG. 1. And, the point of difference from FIGS. 2(A)–2(C) and 3(A)–3(C) resides in the construction of the eyepiece lens.

Here, as to the lens design for an eyepiece lens unit 20a with inclusion of the second variable magnification portion, it is constructed from a first sub-lens unit 4a having a negative refractive power and a second sub-lens unit 5a having a positive refractive power arranged in this order from the front. When shooting with trimming, the first sub-lens unit 4a and the second sub-lens unit 5a both are made to move forward along the finder optical axis to produce a finder magnification.

Also, when the first sub-lens unit 4a is constructed from a negative lens of meniscus shape convex to the object side and a negative lens of biconcave shape, and the second sub-lens unit 5a is constructed from a single lens of biconvex shape, it becomes possible that despite the compact form, excellent aberration correction is maintained.

FIGS. 6(A)–6(C) show still another embodiment. This embodiment uses an eyepiece lens unit 20b which is constructed from three sub-lens units 4b, 5b and 6b, the sub-lens unit 6b of the most eyepiece side being fixed.

The eyepiece lens unit 20b shown in this embodiment comprises, from front to rear, a first sub-lens unit 4b of negative refractive power, a second sub-lens unit 5b of positive refractive power and a third sub-lens unit 6b of negative refractive power, a second magnification change being carried out by moving the first sub-lens unit 4b and the second sub-lens unit 5b both to the object side.

Next, numerical examples 1–5 of the invention are shown. In the numerical examples 1–5, Ri is the radius of curvature of the i-th lens surface counting from the front, Di is the i-th lens thickness or air separation counting from the front, and Ni and $\nu$i are respectively the refractive index and Abbe number of the glass of the i-th lens element counting from the front.

The aspheric surface shape is expressed in coordinates with its X axis in the optical axis and its H axis in a perpendicular direction to the optical axis, the direction in which light advances being taken as positive, by the following equation:

wherein R is the paraxial radius of curvature, and A, B, C, D and E are the aspheric coefficients.

Also, for example, the representation "D-Ox" means $10^{-x}$.

NUMERICAL EXAMPLE 1: (FIGS. 2(A)–2(C) AND 7(A)–7(C))

F = 393.7   2ω = 63.4° – 23.2°

| | | | | | | | |
|---|---|---|---|---|---|---|---|
| R 1 = | −21.85 | D 1 = | 1.5 | N 1 = | 1.88300 | ν 1 = | 40.8 |
| *R 2 = | −123.20 | D 2 = | Variable | | | | |
| R 3 = | 23.41 | D 3 = | 4.0 | N 2 = | 1.49171 | ν 2 = | 57.4 |
| *R 4 = | −17.91 | D 4 = | Variable | | | | |
| R 5 = | 18.55 | D 5 = | 4.0 | N 3 = | 1.49171 | ν 3 = | 57.4 |
| R 6 = | ∞ | D 6 = | 0.0 | | | | |
| R 7 = | ∞ | D 7 = | 2.0 | N 4 = | 1.49171 | ν 4 = | 57.4 |

| | | | | | |
|---|---|---|---|---|---|
| R 8 = | ∞ | D 8 = 12.0 | N 5 = 1.49171 | ν 5 = 57.4 |
| R 9 = | ∞ | D 9 = 1.0 | | |
| R10 = | ∞ | D10 = 8.0 | N 6 = 1.49171 | ν 6 = 57.4 |
| R11 = | ∞ | D11 = 2.0 | N 7 = 1.49171 | ν 7 = 57.4 |
| R12 = | ∞ | D12 = 8.0 | N 8 = 1.49171 | ν 8 = 57.4 |
| R13 = | ∞ | D13 = 12.0 | N 9 = 1.49171 | ν 9 = 57.4 |
| R14 = | ∞ | D14 = 4.0 | N10 = 1.49171 | ν10 = 57.4 |
| R15 = | −42.48 | D15 = Variable | | |
| R16 = | 47.63 | D16 = 3.0 | N11 = 1.49171 | ν11 = 57.4 |
| R17 = | −24.39 | D17 = 0.1 | | |
| R18 = | 24.53 | D18 = 3.0 | N12 = 1.49171 | ν12 = 57.4 |
| R19 = | −349.75 | D19 = Variable | | |
| R20 = | −37.02 | D20 = 1.5 | N13 = 1.49171 | ν13 = 57.4 |
| R21 = | 19.78 | D21 = 14.0 | | |
| R22 = Eye Point | | | | |

| 2ω | State 1 | State 2 | State 3 |
|---|---|---|---|
| D | 63.4° | 34.4° | 23.2° |
| D 2 | 25.83 | 7.15 | 7.15 |
| D 4 | 12.40 | 24.58 | 24.58 |
| D15 | 19.00 | 19.00 | 19.00 |
| D19 | 2.00 | 2.00 | 2.00 |

$$\frac{fa3 \cdot fb3}{fa1 \cdot fb1} = 0.75$$

Aspheric Coefficient for R2

Paraxial R = −1.232D+02

A = 0.0    B = −1.164D−04

C = −4.142D−07    D = 5.669D−09

E = 5.365D−10

Aspheric Coefficient for R4

Paraxial R = -1.791D+01

A = 0.0        B = 2.654D-04

C = -3.555D-06    D = 7.593D-09

E = 2.017D-10

NUMERICAL EXAMPLE 2: (FIGS. 3(A)-3(C) and 8(A)-8(C))

F = 542.4    2ω = 30.4° - 7.8°

| | | | | | |
|---|---|---|---|---|---|
| R 1 = | -16.38 | D 1 = | 1.5 | N 1 = 1.49171 | ν 1 = 57.4 |
| R 2 = | 31.87 | D 2 = | Variable | | |
| R 3 = | 18.52 | D 3 = | 3.5 | N 2 = 1.49171 | ν 2 = 57.4 |
| *R 4 = | -16.45 | D 4 = | Variable | | |
| R 5 = | 47.88 | D 5 = | 2.0 | N 3 = 1.49171 | ν 3 = 57.4 |
| *R 6 = | -93.72 | D 6 = | 1.0 | | |
| R 7 = | ∞ | D 7 = | 2.0 | N 4 = 1.49171 | ν 4 = 57.4 |
| R 8 = | ∞ | D 8 = | 12.0 | N 5 = 1.49171 | ν 5 = 57.4 |
| R 9 = | ∞ | D 9 = | 8.0 | N 6 = 1.49171 | ν 6 = 57.4 |
| R10 = | ∞ | D10 = | 2.0 | N 7 = 1.49171 | ν 7 = 57.4 |
| R11 = | ∞ | D11 = | 8.0 | N 8 = 1.49171 | ν 8 = 57.4 |
| R12 = | ∞ | D12 = | 1.0 | | |
| R13 = | ∞ | D13 = | 12.0 | N 9 = 1.49171 | ν 9 = 57.4 |
| R14 = | ∞ | D14 = | 4.0 | N10 = 1.49171 | ν10 = 57.4 |
| R15 = | -45.00 | D15 = | Variable | | |
| R16 = | 48.16 | D16 = | 5.0 | N11 = 1.49171 | ν11 = 57.4 |
| R17 = | -24.64 | D17 = | 0.1 | | |
| R18 = | 24.44 | D18 = | 3.0 | N12 = 1.49171 | ν12 = 57.4 |
| R19 = | -1107.28 | D19 = | Variable | | |
| R20 = | -26.75 | D20 = | 1.5 | N13 = 1.49171 | ν13 = 57.4 |
| R21 = | 30.42 | D21 = | 14.0 | | |
| R22 = | Eye Point | | | | |

| 2ω | State 1 | State 2 | State 3 |
|---|---|---|---|
| D | 30.4° | 14.4° | 7.8° |
| D 2 | 7.88 | 1.24 | 1.24 |
| D 4 | 3.00 | 28.28 | 28.28 |
| D15 | 34.00 | 34.00 | 18.84 |
| D19 | 2.00 | 2.00 | 15.16 |

$$\frac{fa3 \cdot fb3}{fa1 \cdot fb1} = 1$$

Aspheric Coefficient for R4

Paraxial R = $-1.645D+01$

A = 0.0          B = $4.987D-05$

C = $-3.319D-07$    D = $3.091D-09$

E = $2.420D-10$

Aspheric Coefficient for R6

Paraxial R = $-9.372D+01$

A = 0.0          B = $8.425D-05$

C = $2.457D-07$     D = $-1.212D-08$

E = $-1.637D-10$

NUMERICAL EXAMPLE 3: (FIGS. 4(A)–4(C) and 9(A)–9(C))

2ω = 30.4° – 10.3°

| | | | | |
|---|---|---|---|---|
| R 1 = −16.38 | D 1 = 1.5 | N 1 = 1.49171 | ν 1 = 57.4 |
| R 2 = 31.87 | D 2 = Variable | | |
| R 3 = 18.52 | D 3 = 3.5 | N 2 = 1.49171 | ν 2 = 57.4 |
| *R 4 = −16.45 | D 4 = Variable | | |

| | | | |
|---|---|---|---|
| R 5 = 47.88 | D 5 = 2.0 | N 3 = 1.49171 | ν 3 = 57.4 |
| *R 6 = -93.72 | D 6 = 1.0 | | |
| R 7 = ∞ | D 7 = 2.0 | N 4 = 1.49171 | ν 4 = 57.4 |
| R 8 = ∞ | D 8 = 12.0 | N 5 = 1.49171 | ν 5 = 57.4 |
| R 9 = ∞ | D 9 = 8.0 | N 6 = 1.49171 | ν 6 = 57.4 |
| R10 = ∞ | D10 = 2.0 | N 7 = 1.49171 | ν 7 = 57.4 |
| R11 = ∞ | D11 = 8.0 | N 8 = 1.49171 | ν 8 = 57.4 |
| R12 = ∞ | D12 = 1.0 | | |
| R13 = ∞ | D13 = 12.0 | N 9 = 1.49171 | ν 9 = 57.4 |
| R14 = ∞ | D14 = 0.0 | N10 = 1.49171 | ν10 = 57.4 |
| R15 = ∞ | D15 = Variable | | |
| R16 = 21.72 | D16 = 1.5 | N11 = 1.77250 | ν11 = 49.6 |
| R17 = 12.29 | D17 = 1.5 | | |
| R18 = -232.68 | D18 = 1.5 | N12 = 1.49171 | ν12 = 57.4 |
| R19 = 29.36 | D19 = Variable | | |
| R20 = 31.75 | D20 = 3.0 | N13 = 1.88300 | ν13 = 40.8 |
| R21 = -42.19 | D21 = 14.0 | | |
| R22 = Eye Point | | | |

| 2ω | State 1 | State 2 | State 3 |
|---|---|---|---|
| D | 30.4° | 14.4° | 10.3° |
| D 2 | 7.88 | 1.24 | 1.24 |
| D 4 | 3.00 | 28.28 | 28.28 |
| D15 | 29.92 | 29.92 | 8.96 |
| D19 | 5.04 | 5.04 | 8.99 |

$$\frac{fa3 \cdot fb3}{fa1 \cdot fb1} = 0.75$$

Aspheric Coefficient for R4

Paraxial R = -1.645D+01

A = 0.0          B = 4.987D-05

C = -3.319D-07   D = 3.091D-09

E = 2.420D-10

Aspheric Coefficient for R6

Paraxial R = -9.372D+01

A = 0.0          B = 8.425D-05

C = 2.457D-07    D = -1.212D-08

E = -1.637D-10

NUMERICAL EXAMPLE 4: (FIGS. 5(A)-5(C) and 10(A)-10(C))

$2\omega = 30.4° - 10.3°$

| | | | |
|---|---|---|---|
| R 1 = -16.38 | D 1 = 1.5 | N 1 = 1.49171 | $\nu$ 1 = 57.4 |
| R 2 = 31.87 | D 2 = Variable | | |
| R 3 = 18.52 | D 3 = 3.5 | N 2 = 1.49171 | $\nu$ 2 = 57.4 |
| *R 4 = -16.45 | D 4 = Variable | | |
| R 5 = 47.88 | D 5 = 2.0 | N 3 = 1.49171 | $\nu$ 3 = 57.4 |
| *R 6 = -93.72 | D 6 = 1.0 | | |
| R 7 = ∞ | D 7 = 2.0 | N 4 = 1.49171 | $\nu$ 4 = 57.4 |
| R 8 = ∞ | D 8 = 12.0 | N 5 = 1.49171 | $\nu$ 5 = 57.4 |
| R 9 = ∞ | D 9 = 8.0 | N 6 = 1.49171 | $\nu$ 6 = 57.4 |
| R10 = ∞ | D10 = 2.0 | N 7 = 1.49171 | $\nu$ 7 = 57.4 |
| R11 = ∞ | D11 = 8.0 | N 8 = 1.49171 | $\nu$ 8 = 57.4 |
| R12 = ∞ | D12 = 1.0 | | |
| R13 = ∞ | D13 = 12.0 | N 9 = 1.49171 | $\nu$ 9 = 57.4 |
| R14 = ∞ | D14 = 0.0 | N10 = 1.49171 | $\nu$10 = 57.4 |
| R15 = ∞ | D15 = Variable | | |
| R16 = 8.84 | D16 = 1.5 | N11 = 1.77250 | $\nu$11 = 49.6 |
| R17 = 7.73 | D17 = 3.0 | | |
| R18 = -25.28 | D18 = 1.5 | N12 = 1.49171 | $\nu$12 = 57.4 |
| R19 = 22.16 | D19 = Variable | | |
| R20 = 41.46 | D20 = 3.0 | N13 = 1.49171 | $\nu$13 = 57.4 |
| R21 = -50.61 | D21 = 0.1 | | |
| R22 = 58.47 | D22 = 3.0 | N14 = 1.77250 | $\nu$14 = 49.6 |
| R23 = -51.89 | D23 = 14.0 | | |
| R24 = Eye Point | | | |

| 2ω | State 1 | State 2 | State 3 |
|---|---|---|---|
| D | 30.4° | 14.4° | 10.3° |
| D 2 | 7.88 | 1.24 | 1.24 |
| D 4 | 3.00 | 28.28 | 28.28 |
| D15 | 27.11 | 27.11 | 5.87 |
| D19 | 5.04 | 5.04 | 8.94 |

$$\frac{fa3 \cdot fb3}{fa1 \cdot fb1} = 0.75$$

Aspheric Coefficient for R4

Paraxial R = −1.645D+01

A = 0.0      B = 4.987D−05

C = −3.319D−07    D = 3.091D−09

E = 2.420D−10

Aspheric Coefficient for R6

Paraxial R = −9.372D+01

A = 0.0      B = 8.425D−05

C = 2.457D−07    D = −1.212D−08

E = −1.637D−10

NUMERICAL EXAMPLE 5: (FIGS. 6(A)–6(C) and 11(A)–11(C))

F = −735.33179    2ω = 30.4° − 7.8°

R 1 = −16.388   D 1 = 1.50    N 1 = 1.49171   ν 1 = 57.4
R 2 = 31.878    D 2 = Variable
R 3 = 18.525    D 3 = 3.50    N 2 = 1.49171   ν 2 = 57.4

| | | | |
|---|---|---|---|
| R 4 = −16.450 | D 4 = Variable | | |
| R 5 = 47.866 | D 5 = 2.00 | N 3 = 1.49171 | ν 3 = 57.4 |
| *R 6 = −50.000 | D 6 = 1.00 | | |
| R 7 = ∞ | D 7 = 2.00 | N 4 = 1.49171 | ν 4 = 57.4 |
| R 8 = ∞ | D 8 = 12.00 | N 5 = 1.49171 | ν 5 = 57.4 |
| R 9 = ∞ | D 9 = 8.00 | N 6 = 1.49171 | ν 6 = 57.4 |
| R10 = ∞ | D10 = 2.00 | N 7 = 1.49171 | ν 7 = 57.4 |
| R11 = ∞ | D11 = 3.00 | N 8 = 1.49171 | ν 8 = 57.4 |
| R12 = ∞ | D12 = 1.00 | | |
| R13 = ∞ | D13 = 12.00 | N 9 = 1.49171 | ν 9 = 57.4 |
| R14 = ∞ | D14 = 0.0 | N10 = 1.49171 | ν10 = 57.4 |
| R15 = Stop | D15 = Variable | | |
| R16 = −45.000 | D16 = 1.50 | N11 = 1.49171 | ν11 = 57.4 |
| R17 = 22.000 | D17 = Variable | | |
| R18 = 73.000 | D18 = 3.00 | N12 = 1.49171 | ν12 = 57.4 |
| R19 = −21.000 | D19 = 0.10 | | |
| R20 = 25.000 | D20 = 3.00 | N13 = 1.49171 | ν13 = 57.4 |
| R21 = −85.000 | D21 = Variable | | |
| R22 = −35.000 | D22 = 1.50 | N14 = 1.49171 | ν14 = 57.4 |
| R23 = 50.000 | D23 = 14.00 | | |

As has been described above, according to the present invention, by taking the above-described features, a zoom finder of compact form with high a magnification variation ratio, while still permitting the overall field of view to be viewed at once from a constant eye point throughout the entire range of variation of the magnification, can be realized.

What we claimed is:

1. A variable magnification finder optical device for effecting a first and a second magnification change comprising, from front to rear:
    an objective lens unit having a first variable magnification portion with an overall positive refractive power;
    an optical member for reversing an image formed by said objective lens unit; and
    an eyepiece lens unit having a second variable magnification portion with an overall positive refractive power 2. A device according to claim 1, wherein said first variable magnification portion performs the first magnification change in association with variation of the magnification of a photographic lens.

3. A device according to claim 1, wherein said second variable magnification portion is operatively connected to indicating means for indicating a trimming shot, and wherein the second magnification change is carried out by indication of said indicating means.

4. A device according to claim 1, wherein said optical member is a Porro prism having four reflection surfaces.

5. A device according to claim 1 or 2, wherein said objective lens unit comprises, from front to rear, a first sub-lens unit of negative refractive power, a second sub-lens unit of positive refractive power and a third sub-lens unit of positive refractive power, wherein said first and said second sub-lens units are moved along a finder optical axis to carry out the first magnification change.

6. A device according to claim 1 or 3, wherein said eyepiece lens unit comprises, from front to rear, a first sub-lens unit of positive refractive power, a second sub-lens unit of positive refractive power and a third sub-lens unit of negative refractive power, wherein said second and said third sub-lens units are moved along a finder optical axis to carry out a magnification change.

7. A device according to claim 1 or 3, wherein said eyepiece lens unit comprises, from front to rear, a first sub-lens unit of negative refractive power and a second sub-lens unit of positive refractive power, wherein said first and said second sub-lens units are moved along a finder optical axis to carry out the second magnification change.

8. A device according to claim 1 or 3, wherein said eyepiece lens unit comprises, from front to rear, a first sub-lens unit of negative refractive power, a second sub-lens unit of positive refractive power, a third sub-lens unit of negative refractive power, wherein the second magnification change is carried out by moving said first and said second sub-lens units along a finder optical axis.

9. A device according to claim 1, satisfying the following condition:

$$0.4 < (fa_3 \cdot fb_3)/(fa_1 \cdot fb_1) < 2.5$$

where $fa_1$ and $fb_1$ are, respectively, the focal lengths of said objective lens unit and said eyepiece lens unit when the finder magnification of said finder optical device is minimum, and $fa_3$ and $fb_3$ are, respectively, the focal lengths of said objective lens unit and said eyepiece lens unit when the finder magnification is maximum.

10. A device according to claim 1, satisfying the following condition:

$$-0.2 < (d_T - d_W)/(d_T + d_W) < 0.2$$

where $d_W$ and $d_T$ are the values of the distance from a prescribed image plane on which said objective lens unit forms an image to the last lens surface of said eyepiece lens unit in the wide angle end and the telephoto end of said eyepiece lens unit, respectively.

11. A finder optical device provided separately from a photographic lens, comprising:
   an objective lens unit having a first variable magnification portion including a plurality of sub-lens units movable along a finder optical axis; and
   an eyepiece lens unit for observing an image formed by said objective lens unit, said eyepiece lens unit having a second variable magnification portion including a plurality of sub-lens units movable along the finder optical axis.

12. A device according to claim 11, wherein said first variable magnification portion performs the first magnification change in association with a variation of the magnification of said photographic lens.

13. A device according to claim 11, wherein said second variable magnification portion is operatively connected to indicating means for indicating a trimming shot, and wherein a second magnification change is carried out by indication of said indicating means.

14. A device according to claim 11, satisfying the following condition:

$$0.4 < (fa_3 \cdot fb_3)/(fa_1 \cdot fb_1) < 2.5$$

where $fa_1$ and $fb_1$ are, respectively, the focal lengths of said objective lens unit and said eyepiece lens unit when the finder magnification of said finder optical device is a minimum, and $fa_3$ and $fb_3$ are, respectively, the focal lengths of said objective lens unit and said eyepiece lens unit when the finder magnification a maximum.

15. A device according to claim 11, satisfying the following condition:

$$-0.2 < (d_T - d_W)/(d_T + d_W) < 0.2$$

where $d_W$ and $d_T$ are the values of the distance from a prescribed image plane on which said objective lens unit forms an image to the last lens surface of said eyepiece lens unit in the wide angle end and the telephoto end of said eyepiece lens unit, respectively.

16. A device according to claim 11, wherein said objective lens unit comprises, from front to rear, a first sub-lens unit of negative refractive power, a second sub-lens unit of positive refractive power and a third sub-lens unit of positive refractive power, wherein said first and said second sub-lens units are moved along a finder optical axis to carry out the first magnification change.

17. A device according to claim 11, wherein said eyepiece lens unit comprises, from front to rear, a first sub-lens unit of negative refractive power and a second sub-lens unit of positive refractive power, wherein said first and said second sub-lens units are moved along a finder optical axis to carry out the second magnification change.

18. A device according to claim 11, further comprising a Porro prism arranged in a position at which said objective lens unit forms an image.

* * * * *